Jan. 13, 1959  S. HAWXHURST  2,868,575
GASKET AND METHOD OF MAKING SAME
Filed Aug. 16, 1954  2 Sheets-Sheet 1

INVENTOR:
STEPHEN HAWXHURST
BY
Edward R. Lowndes

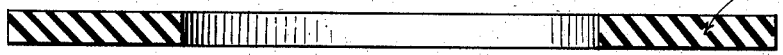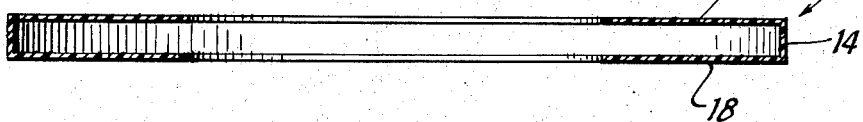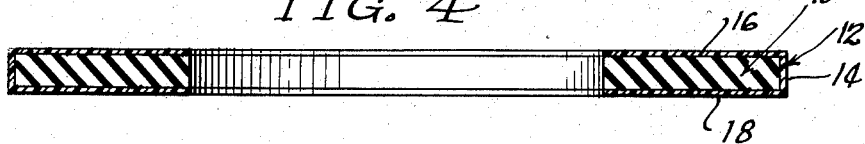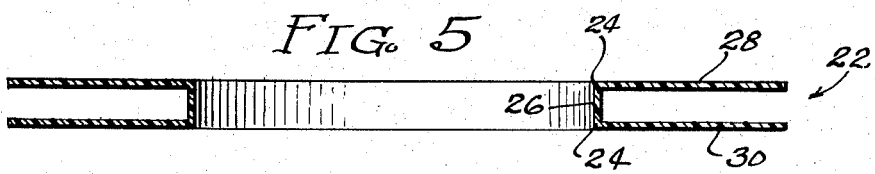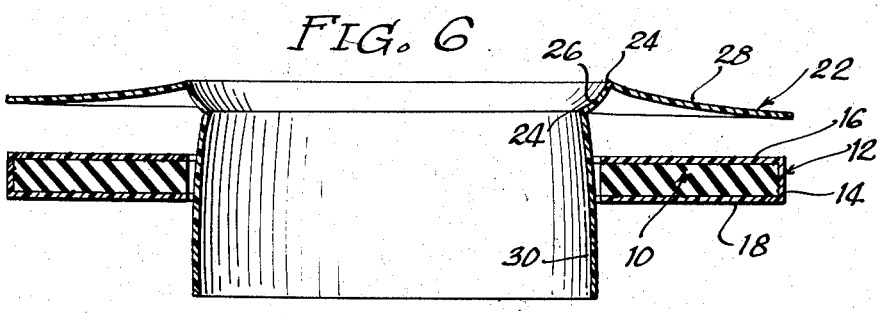

United States Patent Office 2,868,575
Patented Jan. 13, 1959

2,868,575

GASKET AND METHOD OF MAKING SAME

Stephen Hawxhurst, Glencoe, Ill., assignor to Crane Packing Company, Chicago, Ill., a corporation of Illinois Application August 16, 1954, Serial No. 450,150

4 Claims. (Cl. 288—16)

The present invention relates to jacketed gaskets and also to a method of forming the same. More particularly the invention is concerned with a laminated gasket construction which is heat and chemical resistant as well as being impervious to the infiltration of liquids or gases even when low bolting pressures are employed. It is among the principal objects of the invention to provide a laminated gasket construction in which both the inner and the outer peripheries of the gasket are effectively sealed against the infiltration of liquids or gases under the application of low bolting pressures.

In view of the fact that vulcanized rubber and certain rubber compositions as well as other inherently resilient compounds are deleteriously affected by the action of certain solvents and are subject to a swelling action in the presence of liquid hydrocarbon fuels, efforts have been made to take advantage of the excellent sealing characteristics of these materials for gasket purposes by partially or entirely covering the central core of the material with a protective layer of a suitable heat and chemical resistant substance so that the gasket as a whole will retain its resiliency while at the same time the resilient material thereof will be protected from contact with the liquid undergoing sealing. In thus producing a gasket having a protected central vulcanized rubber core, total enclosure of the core has been possible only when the protective layer is susceptible to application to the core by painting, spraying or dipping of the core or, alternatively, by folding the core within a thin film or films of protective material and bonding the same thereto by a suitable adhesive. It has been found however that those chemicals, as for example any of the polyamides falling under the generic term "nylon," which are capable of such application, with or without the use of adhesive, to the central core are either not heat resistant or not chemical resistant to a sufficiently wide group of chemicals as to render the gasket capable of universal application. Another substance that has been employed as an outer protective jacket is polymonochlorotrifluoroethylene. This substance as well as certain other substances possessing similar physical and chemical characteristics can be applied to a central rubber core as a protective outer coating and heat sealed around the core so that total enclosure of the core is possible. However, such substances are insufficiently heat resistant within reasonable limits or chemical resistant to certain solvents as to render the completed gasket universally applicable for the sealing of all manner of liquids at low or high temperatures.

One substance, namely polytetrafluoroethylene, sold under the trade name "Teflon" by E. I. du Pont de Nemours and Company, is characterized by its chemical inertness which is characteristic from extremely low temperatures up to 570° F. Through this wide temperature range it resists the attack of chemical reagents and dissolution by solvents. Such a material therefore is much to be desired in the construction of gaskets and, heretofore numerous attempts have been made to produce a gasket having a central rubber or other resilient core which is totally enclosed by an outer layer or protective coating of "Teflon." Such attempts have met with little success inasmuch as this material, although capable of being applied by painting, spraying, or dipping, must be cured before it can become serviceable as a gasket material and the temperatures involved in the curing process are far beyond those at which the rubber or other core material will be destroyed. The curing of "Teflon" cannot be accomplished by conventional techniques used with other plastics because the polymer does not melt and flow even at extremely high temperatures. It is necessary to cure this material by a process roughly comparable to that used in powder metallurgy which depends on fusion of solid particles that have been compressed into a mass of the desired shape. This process is roughly equivalent to the process known as sintering. This sintering of "Teflon" material involves temperatures which would ordinarily destroy the rubber or other core material enclosed by the unsintered material.

The present invention provides a method whereby a central core of vulcanized rubber or other similar resilient material may be completely encased in an outer jacket of cured "Teflon" with the "Teflon" intimately enclosing the central core and being completely sealed so as to exclude the admission of destructive fluids into the enclosure formed thereby, the seal being effective not only at low bolting pressures but also when the gasket is in its free state. By such an arrangement, there is provided a gasket possessing the high resiliency of the rubber material while at the same time embodying the chemical, thermal and dielectric qualities of the "Teflon" material.

The provision of a gasket of the character briefly outlined above being among the principal objects of the invention, a further object is to provide a three-piece separable gasket which is capable of ease of assembly and disassembly for the purpose of inspection of parts, replacement and repair.

A further object of the invention is to provide a gasket of this nature in which the "Teflon" parts thereof when initially assembled, are self-locking and self-sealing and do not require the use of adhesives so that the rubber core is completely enclosed and sealed within the outer two-part separable "Teflon" jacket with the parts of the jacket being effectively sealed to each other so that the enclosed core cannot be reached by liquids which may be associated with the gasket when in use.

Another object of the invention is to provide such a gasket in which the two "Teflon" parts thereof present each to the other relatively large sealing areas which come into intimate face-to-face contact with each other, under pressure, when bolting pressures are applied to the gasket.

Still another object of the invention is to provide a gasket of this type in which the protective covering is formed of two pieces and in which the overlapping regions thereof present a labyrinthine path leading from the inside of the gasket to the outside thereof thus assuring adequate sealing of the gasket parts against the flow of liquid from the exterior to the interior thereof.

Yet another object of the invention is to provide a laminated gasket in which the various laminations thereof make intimate contact with one another and serve to effectively exclude the formation of air pockets or cavities in which corrosive liquids might collect.

Still another object of the invention is to provide a laminated gasket in which upon assembly thereof the various parts are held in position against dislodgement with certain areas of the two outer covering parts being sealed together automatically thus dispensing with such operations as adhering, soldering or welding.

While the invention has been described herein specifically in connection with the use of a central core which is formed of resilient rubber or rubberlike material, the invention has application where other materials are employed. For example, materials such as cork, various forms of asbestos fibrous material used in conjunction with a suitable filler material or without a filler material, and prefabricated wire mesh material, steel or other metal wool and the like, may be employed for the central core member.

Other objects and advantages of the invention, not at this time enumerated, will become more readily apparent as the nature of the invention is better understood. In the accompanying drawings forming a part of this specification, a preferred embodiment of the invention has been shown.

In the drawings:

Figure 2 is a side elevation in section of the core of the gasket prior to its assembly with the other parts of the gasket;

Figure 3 is a side elevational view in section of the first protective jacket for the core of Figure 2;

Figure 4 is a side elevational view in section of the core and first jacket in assembled relation;

Figure 5 is a side elevational view in section of a second jacket to be applied to the assembly of Figure 4; and Figure 6 is a side elevational view of the second jacket as it is being applied to the assembly of Figure 4.

Figure 1:
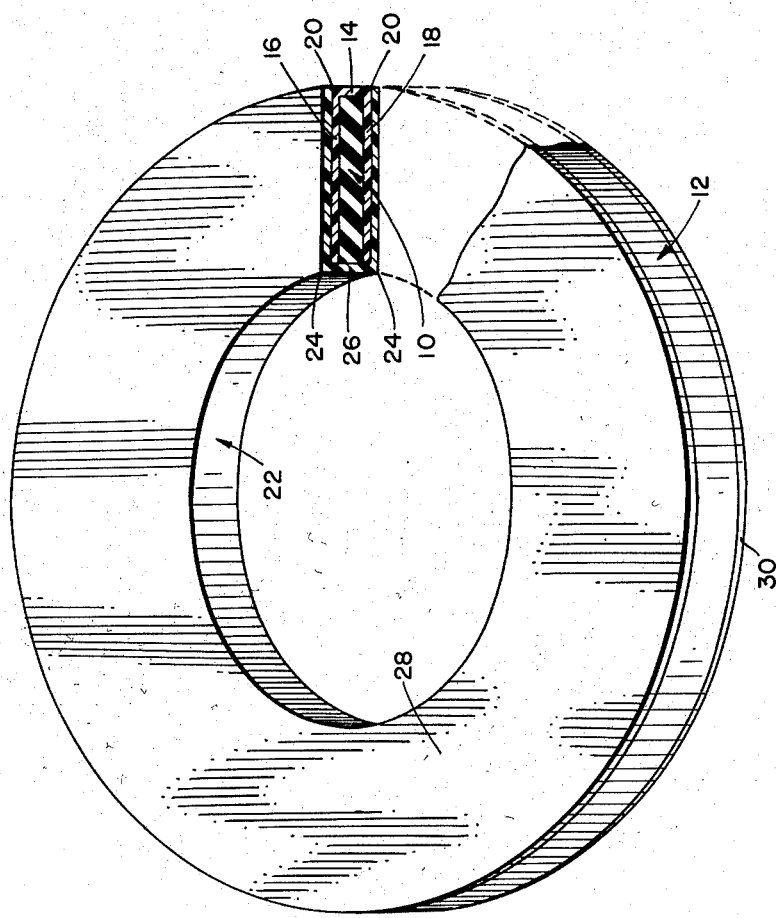
Figure 1 is a perspective view with parts broken away and shown in section of a gasket constructed in accordance with the principles of the present invention.

Referring now to the drawings in detail, the gasket assembly is comprised of an inner gasket ring 10 (Fig. 2) which is formed of any suitable resilient or compressible material such as vulcanized rubber, either natural or synthetic. As shown, the central core 10 is of continuous ringlike configuration and is precisely rectangular in cross section having relatively sharp edges.

Partially surrounding the central core 10 on three sides thereof and extending completely across the outer periphery of the ring is an intermediate U-shaped jacket member 12 (Fig. 3) which is preferably formed of sintered or otherwise cured polytetrafluoroethylene commonly known as "Teflon," and whch is characterized by its chemical inertness throughout a wide temperature range. The "Teflon" jacket 12 is U-shaped in cross section and is formed with a trough bottom 14 and parallel sides 16 and 18 and is of continuous ringlike configuration. The member 12 is preferably machined from solid ring stock by the use of a cutting tool in conjunction with a lathe and the trough portion of the ring is so cut as to provide sharp corners 20 at the inside of the ring so that the ring has a tendency to maintain its cross sectional U-shape without stressing the material. This machining of the "Teflon" member 12 is to be distinguished from a folding operation wherein the material of the ring, particularly at the corners thereof, is placed under stress and is incapable of maintaining its rectangular cross section shape.

Partially enclosing the "Teflon" member 12 and the core 10 is a second "Teflon" ring member 22 (Fig. 5) similar to the member 12 and likewise of machined construction and U-shaped in cross section. The member 22 is provided with sharp corners 24 which exist in a free state without any stressing of the "Teflon" material by virtue of the machining of the member 22. The member 22 is provided with a trough bottom 26 and parallel sides 28 and 30, the bottom 26 bearing against the outside peripheral face of the ring 10 and the member 22 as a whole enclosing the ring with its surrounding jacket 12 on three sides thereof. As illustrated, the sides 28 and 30 of the jacket 22 exist in face-to-face coextensive relationship with respect to the sides 18 and 16 of the jacket 12 and thus broad expanses of sealing surfaces are provided between the two jackets 12 and 22.

In the construction of the jacket 12 the same is machined so as to have an inside dimension which is equal to the free transverse dimensional cross section of the ring 10. Similarly, the jacket 22 is machined so as to have an inside dimension which is approximately equal to the outside dimension of the jacket 12 when the latter is in position on the core 10 so that when the parts are nested together as shown in the drawing, a very tight fitting structure will result which is self-sealing even before the application of bolting pressure to the gasket in an actual installation. This self-sealing or self-locking feature is made possible by the machining of the two jackets as distinguished from a mere folding thereof since in the latter instance there would be a tendency for separation of the laminations which cooperate to make up the gasket.

In the actual construction of a gasket according to the present invention the three parts thereof, namely the core 10 and jackets 12 and 22, are preformed from their respective materials and the inner core is stretched or distorted so that it will slip under one side 16 or 18 of the intermediate "Teflon" jacket 12. In assembling the core 10 and jacket 12, care should be taken to distort the jacket as little as possible so that it will retain its sharply defined rectilinear cross sectional shape. After the assembly of the core 10 into the jacket 12, one side of the outer jacket 22 may be distorted laterally and this side pushed or pulled through the central opening provided by the inner peripheral side 14 of the jacket 12, as shown in Fig. 6, after which the distorted side will move back to its initial position of parallelism with the other side of the jacket. Because of the fact that the distance between the two sides of the outer jacket is equal to the overall thickness of the inner jacket, a very tight sealing effect will obtain at the inner periphery of the gasket as a whole wherein the edges of the side 14 of the inner jacket are firmly held between the sides 28 and 30 of the outer jacket so that, with the gasket existing in its free state, there will be no possibility of ingress of fluid into the inner space bounded by the two jackets.

From the above description it will be apparent that when the improved gasket assembly of the present invention is bolted between the opposed bolting flanges of a pipe coupling for example, very slight bolting pressures will suffice to bring the opposed surfaces of the jacket sides 16 and 28 and 18 and 30 respectively into intimate face-to-face contact with each other so that it is virtually impossible for liquids to find an entrance into the gasket chamber from the outer peripheral edge of the jacket. Since the inner peripheral edge presents no circumferential seam there is no danger whatsoever of exposed liquid entering the jacket chamber from this inner periphery. During handling of the gasket either during assembly or disassembly operations upon a pipe coupling, any corrosive fluids that might possibly enter between the side flanges of the two gaskets, will not pass beyond the circumferential seal at the inner edges of the gasket and furthermore, when the gasket is again reassembled and bolting pressure is applied, any such corrosive material will be squeezed outwardly rather than inwardly of the gasket construction.

The dimensions of the assembled gasket and of the component parts thereof will vary of course depending upon the particular use to which the gasket is intended to be put. Although materials other than natural or synthetic rubber for the central core 10 may be employed and although materials other than "Teflon" are contemplated for the fabrication of the intermediate and outer jackets 12 and 22 respectively, the present invention is mainly predicated upon the fact that the total enclosure of a central rubber core cannot be accomplished by an initial coating and subsequent curing process, or by any process wherein the "Teflon" material is sealed to itself by the application of heat, inasmuch as the rubber core material is unable to withstand the necessary curing or sealing temperatures as the case may be. Thus according to the present invention no heat sealing operations are resorted to and at the same time the core becomes completely enclosed by the "Teflon" material and sealed therein against ingress of liquids even at low bolting pressures or at atmospheric pressure.

In compliance with title 35, U. S. Code, section 112, a preferred form of the invention has been shown in the drawings and will be described herein, but it should be understood that the invention is not limited to the specific disclosure made, and that the appended claims should be construed as broadly as the prior art will permit.

What I claim and desire to secure by Letters Patent is:

1. A composite gasket construction resistant on all outer sides to the swelling and solvent action of acids and liquid hydrocarbons and which retains its flexibility and sealing properties throughout a temperature range of from −70° F. to 572° F., said gasket construction comprising a central core in the form of an endless body of resilient compressible material and being substantially rectangular in cross section with its four circumferential edges presenting relatively sharp corners, an intermediate jacket substantially U-shaped in cross section and having parallel side walls and surrounding said core on three sides thereof including the outer peripheral side of the core and the two sides adjacent thereto and existing in coextensive face-to-face contact with said three sides, and an outer jacket substantially U-shaped in cross section enclosing said intermediate jacket and core as a unit on three sides thereof including the sides presented by said parallel side walls and the side which includes the inner peripheral side of the core, said outer jacket having its inner surfaces in coextensive face-to-face contact with said inner peripheral side of the core and with the parallel side walls of the intermediate jacket, said intermediate and outer jackets both being formed of polytetrafluoroethylene.

2. The method of forming a heat and solvent resistant ring gasket which comprises utilizing a central core ring of resilient compressible material which is square in radial cross section, machining a cylindrical ring of polytetrafluoroethylene by the removal of material to provide a U-shaped intermedate jacket having a base side of a width substantially equal to the longitudinal width of said core and having parallel sides spaced apart a distance substantially equal to the longitudinal width of said core, inserting said core between the said parallel sides of said intermediate jacket so as to cause the jacket to surround said core coextensively on three sides thereof in intimate face-to-face contact therewith, machining a cylindrical ring of polytetrafluoroethylene by the removal of material to provide a U-shaped outer jacket having a base side substantially equal in width to the overall width of the core and intermediate jacket when the latter is installed upon the core and having parallel sides spaced apart a distance substantially equal to the longitudinal width of the intermediate jacket, deforming one side of the outer jacket and passing the same completely through the central opening in the assembled intermediate jacket and core rings and restoring the deformed side to a plane condition wherein said side is in face-to-face contact with one side of the intermediate jacket.

3. A composite gasket construction resistant on all outer sides to the swelling and solvent action of acids and liquid hydrocarbons and which retains its flexibility and sealing properties through a temperature range of from −70° F. to 572° F., said gasket construction comprising a central core in the form of a ring of resilient compressible material and being substantially rectangular the radial cross section with its four circumferential edges presenting relatively sharp corners, an intermediate ring jacket substantially U-shaped in radial cross section and having parallel side walls and surrounding said core on three sides thereof including a longitudinal side of the core and the two sides adjacent thereto and existing in coextensive face-to-face contact with said three sides, and an outer ring jacket substantially U-shaped in radial cross section enclosing said intermediate jacket and core as a unit on three sides thereof including the sides presented by the parallel side walls of said intermediate jacket and the side which includes the other longitudinal side of the core, said outer jacket having its inner surfaces in coextensive face-to-face contact with the other longitudinal side of the core and with the parallel side walls of the intermediate jacket, said intermediate and outer jackets both being formed of polytetrafluoroethylene.

4. The method of forming a heat and solvent resistant ring gasket which comprises utilizing a central core of resilient compressible material which is square in radial cross section, machining a cylindrical ring of polytetrafluoroethylene by the removal of material to provide a U-shaped intermediate jacket having a base side of a width substantially equal to the longitudinal width of said core and having parallel sides spaced apart a distance substantially equal to the radial width of said core, inserting said core between the said parallel sides of said intermediate jacket so as to cause the jacket to surround said core coextensively on three sides thereof in intimate face-to-face contact therewith, machining a cylindrical ring of polytetrafluoroethylene by the removal of material to provide a U-shaped outer jacket having a base side substantially equal in width to the longitudinal width of the intermediate jacket and having parallel sides spaced apart a distance substantially equal to the longitudinal width of the intermediate jacket when the latter is installed upon the core, inserting said assembled intermediate jacket and core between the parallel sides of said outer jacket by deforming one of said sides to reduce its diameter to enable the insertion to be made, and thereafter bringing the parallel sides of the intermediate jacket into face-to-face contact with the adjacent parallel sides of the outer jacket.

References Cited in the file of this patent

UNITED STATES PATENTS

| | | |
|---|---|---|
| 739,995 | Dewrance | Sept. 29, 1903 |
| 1,849,359 | Braden | Mar. 15, 1932 |
| 2,580,546 | Hobson | Jan. 1, 1952 |
| 2,597,976 | Cousins | May 27, 1952 |

FOREIGN PATENTS

| | | |
|---|---|---|
| 80,656 | Sweden | June 12, 1934 |

UNITED STATES PATENT OFFICE

CERTIFICATE OF CORRECTION

Patent No. 2,868,575                          January 13, 1959

Stephen Hawxhurst

It is hereby certified that error appears in the printed specification of the above numbered patent requiring correction and that the said Letters Patent should read as corrected below.

Column 2, line 38, for "purpose" read -- purposes --; column 3, line 44, for "whch" read -- which --; column 4, line 29, for "the ,jacket" read -- the jacket --; column 5, line 42, for "intermedate" read -- intermediate --; column 6, line 7, for "rectangular the" read -- rectangular in --.

Signed and sealed this 4th day of August 1959.

(SEAL)
Attest:

KARL H. AXLINE
Attesting Officer

ROBERT C. WATSON
Commissioner of Patents